Dec. 10, 1968  A. F. ORDAS  3,416,015

STEPPING MOTOR

Filed April 29, 1965  4 Sheets-Sheet 2

Inventor:
Arthur F. Ordas,
by Hood, Just & Irish
Attorneys.

Dec. 10, 1968         A. F. ORDAS          3,416,015
                      STEPPING MOTOR

Filed April 29, 1965                    4 Sheets-Sheet 3

Inventor:
Arthur F. Ordas,
by Hood, Gust & Ash
Attorneys.

Dec. 10, 1968     A. F. ORDAS     3,416,015
STEPPING MOTOR
Filed April 29, 1965                                                4 Sheets-Sheet 4
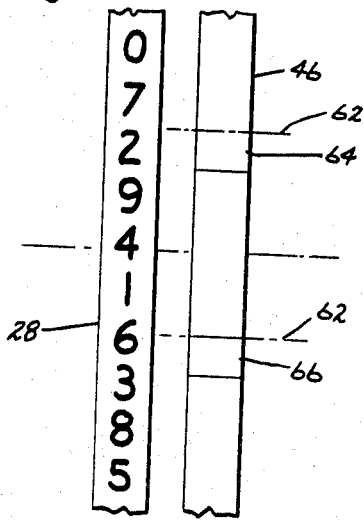
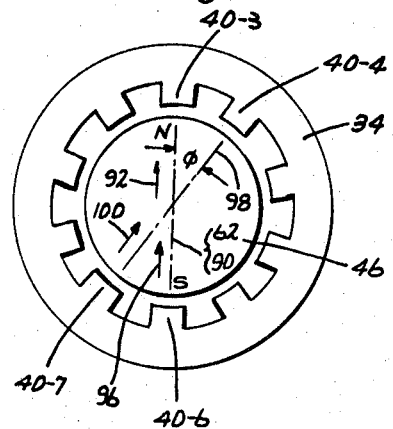
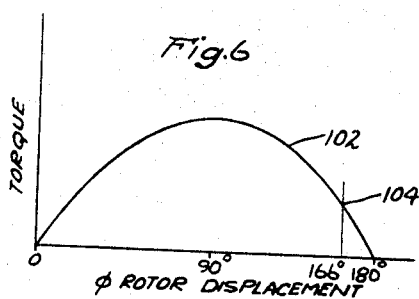
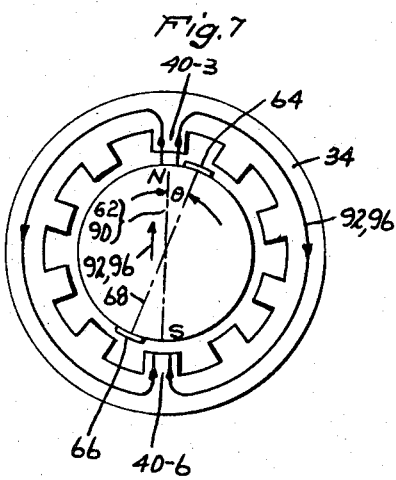
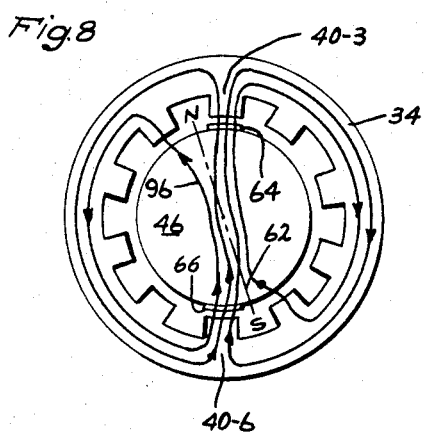
Inventor:
Arthur F. Ordas,
by Hood, Gust & Irish
Attorneys.

United States Patent Office 3,416,015
Patented Dec. 10, 1968

3,416,015
STEPPING MOTOR
Arthur F. Ordas, Huntertown, Ind., assignor to Bowmar Instrument Corporation, Fort Wayne, Ind., a corporation of Indiana
Filed Apr. 29, 1965, Ser. No. 451,812
11 Claims. (Cl. 310—49)

ABSTRACT OF THE DISCLOSURE

A stepping motor, which may be used as an electromagnetic indicator device, having a stator core member with a central bore and a plurality of equally spaced winding slots extending radially outwardly therefrom and mutually defining a plurality of discrete poles each having a pole face, and windings positioned in the slots for selectively energizing the pole faces. A permanent magnet rotor member is positioned in the bore, the rotor member having a peripheral surface which defines first radial air gaps with the stator pole faces, the rotor member being diametrically polarized on a first axis. The rotor member has a pair of diametrically opposite polar projections formed thereon which project radially outwardly from its peripheral surface and which define pole faces, the rotor pole faces being disposed on a second axis which is angularly displaced from the first axis. The rotor pole faces respectively define second radial air gaps with the stator pole faces which are narrower than the first air gaps so that the first rotor member axis is aligned with the respective stator pole face when a particular winding is energized and the second axis is aligned with the respective stator pole face when all of the windings are de-energized thus permitting 180° rotation of the rotor member in a single step.

---

This invention relates generally to stepping motors and, more particularly, to a stepping motor of the permanent magnet-excited type adapted to provide a plurality of predetermined rotor positions in response to selective energization of respective field windings.

Stepping motors may be employed for indicating a plurality of different rotational positions and thus are commonly employed for the display of digital information. A common type of stepping motor employed for such applications comprises a diametrically polarized permanent magnet rotor and a stator structure having a plurality of discrete poles with selectively energizable field windings thereon. Selective energization of the field windings causes the magnetic axis of the rotor to align itself with the respective poles of the field structure which are energized thereby to provide the desired rotational indication. In some types of magnetic digital indicators, it is desired to rotate the rotor by 180° in one step, commonly accomplished by merely reversing the polarity of the voltage energizing the respective poles. However, the torque available for rotating the rotor is a function of the angular displacement of the magnetic axis of the rotor from the axis of energization of the field structure. Thus, while the rotor can be advanced by 180° in successive steps, i.e., from pole number 1 to pole number 2, from pole number 2 to pole number 3, et seq., since in each case there is an angular displacement between the magnetic axis of the rotor and the axis of energization, in the case of 180° rotation in a single step, there is no such angular displacement and a form of top dead-center condition is provided. It is therefore desirable to provide a stepping motor of the permanent magnet type in which the rotor can be rotated by 180° in a single step.

It is accordingly an object of this invention to provide an improved permanent magnet stepping motor.

Another object of the invention is to provide an improved permanent magnet stepping motor in which the rotor may be rotated by 180° in a single step.

In accordance with the broader aspects of the invention, a stepping motor is provided comprising a stator core member having means forming a plurality of discrete pole faces defining a bore, and winding means are provided for selectively energizing the pole faces. A permanent magnet rotor member is provided in the bore of the stator core member, the rotor member being diametrically polarized on a first axis and having diametrically opposite pole faces formed thereon disposed on a second axis which is angularly displaced from the first axis. With this arrangement, when one of the stator pole faces is excited by energization of the respective field winding means, the magnetic axis, i.e., the first axis of the rotor, aligns itself with the respective stator pole face. However, when the stator is de-energized, the rotor pole face, i.e., the second axis, will align itself with the respective stator pole face since the permanent magnet rotor flux seeks the path of least reluctance, i.e., the minimum air gap, which is through the rotor pole face. Thus, an angular displacement of the rotor is provided when the stator is de-energized which eliminates the top dead-center condition above-described and permits 180° rotation of the rotor in a single step.

The above-mentioned and other features and objects of this invention and the manner of attaining them will become more apparent and the invention itself will be best understood by reference to the following description of an embodiment of the invention taken in conjunction with the accompanying drawings, wherein:

FIG. 4 is a schematic diagram showing the numerals displayed on the digital wheel and the relationship of the pole shoes on the permanent magnet rotor with respect thereto;

FIG. 5 is a schematic diagram showing the angular displacement between the magnetic axis of the rotor and the axis of energization of the field in order to provide rotation of the rotor;

FIG. 6 is a diagram showing the relationship of rotor torque to angular displacement of the magnetic axis of the rotor from the axis of energization of the field;

FIG. 7 is a schematic illustration of the invention with the field energized; and FIG. 8 is a schematic illustration of the invention with the field de-energized.

Figure 1:
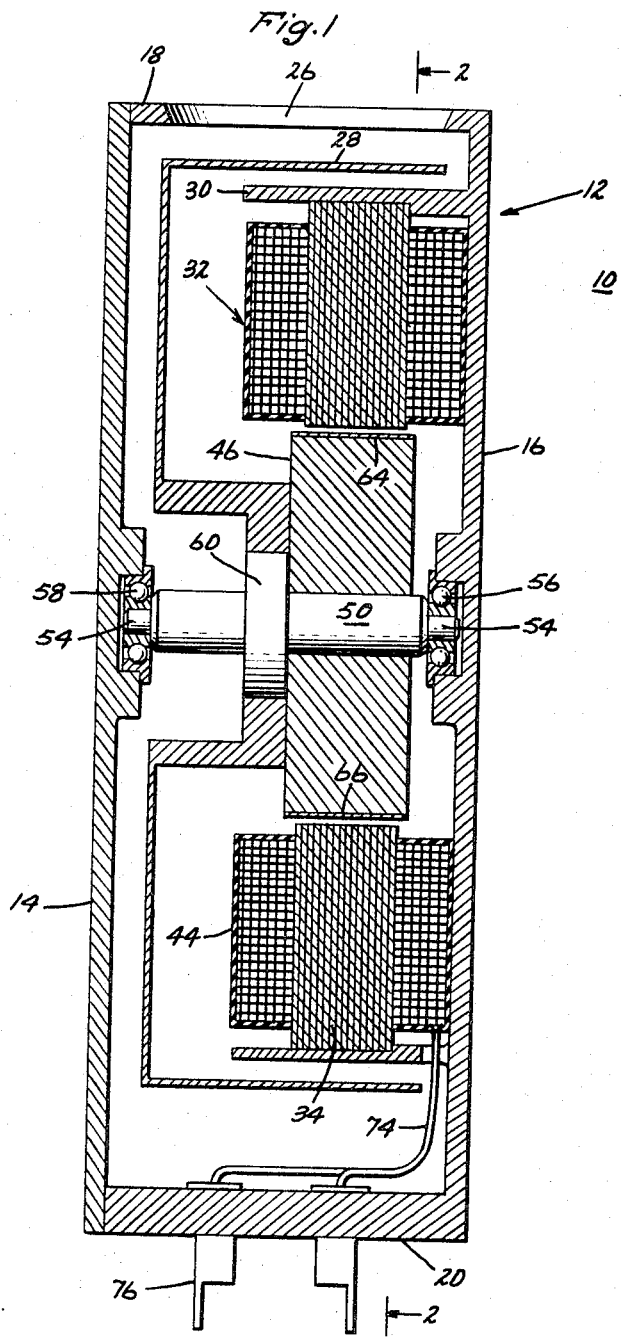
FIG. 1 is a side cross-sectional view showing a magnetic digital indicator incorporating the invention.

Referring now to FIGS. 1 through 4 of the drawings, the improved permanent magnet stepping motor of the invention is shown incorporated in a magnetic digital indicator, generally indicated at 10, having complementary enclosing housing parts 12 and 14. Housing part 12 includes an end wall 16 and top and bottom walls 18, 20. Housing part 14 is secured to the housing part 12 in any suitable manner, as by through-bolts 22. Housing part 12 may have suitable mounting brackets 24 formed thereon for mounting the device on a panel. Top wall 18 has a suitable window 26 formed therein for viewing the digits displayed on the drum 28.

End wall 16 of housing part 12 has an annular flange portion 30 integrally formed thereon which supports stator assembly 32. Stator assembly 32 comprises a stator core member 34 formed of a stacked plurality of relatively thin laminations of magnetic material and having a central bore 36. A plurality of evenly spaced winding slots 38 extend radially outwardly from the bore 36 of the stator core member 34 and mutually define discrete stator poles 40 therebetween, each of the poles 40 having a pole face 42. In the illustrated embodiment intended for displaying ten digits from 0 to 9, ten winding slots 38 are provided thus defining ten stator poles 40. Appropriate field windings 44 are disposed in the winding slots 38 and when selectively energized from a direct current source of potential of predetermined polarity, magnetically excite respective poles 40, as will be hereinafter more fully described.

A permanent magnet rotor member 46 is provided having a cylindrical outer surface 48 and mounted on shaft 50. Shaft 50 has its opposite ends, 52, 54, respectively rotatably journaled in suitable bearings 56, 58 seated in suitable bearing pockets formed in end wall 16 of housing part 12 and in housing part 14, as best seen in FIG. 1. Drum 28, upon which the digits are displayed, is mounted on and secured to a hub portion 60 of the shaft 50 for rotation therewith and with the permanent magnet rotor 46.

Figure 2:
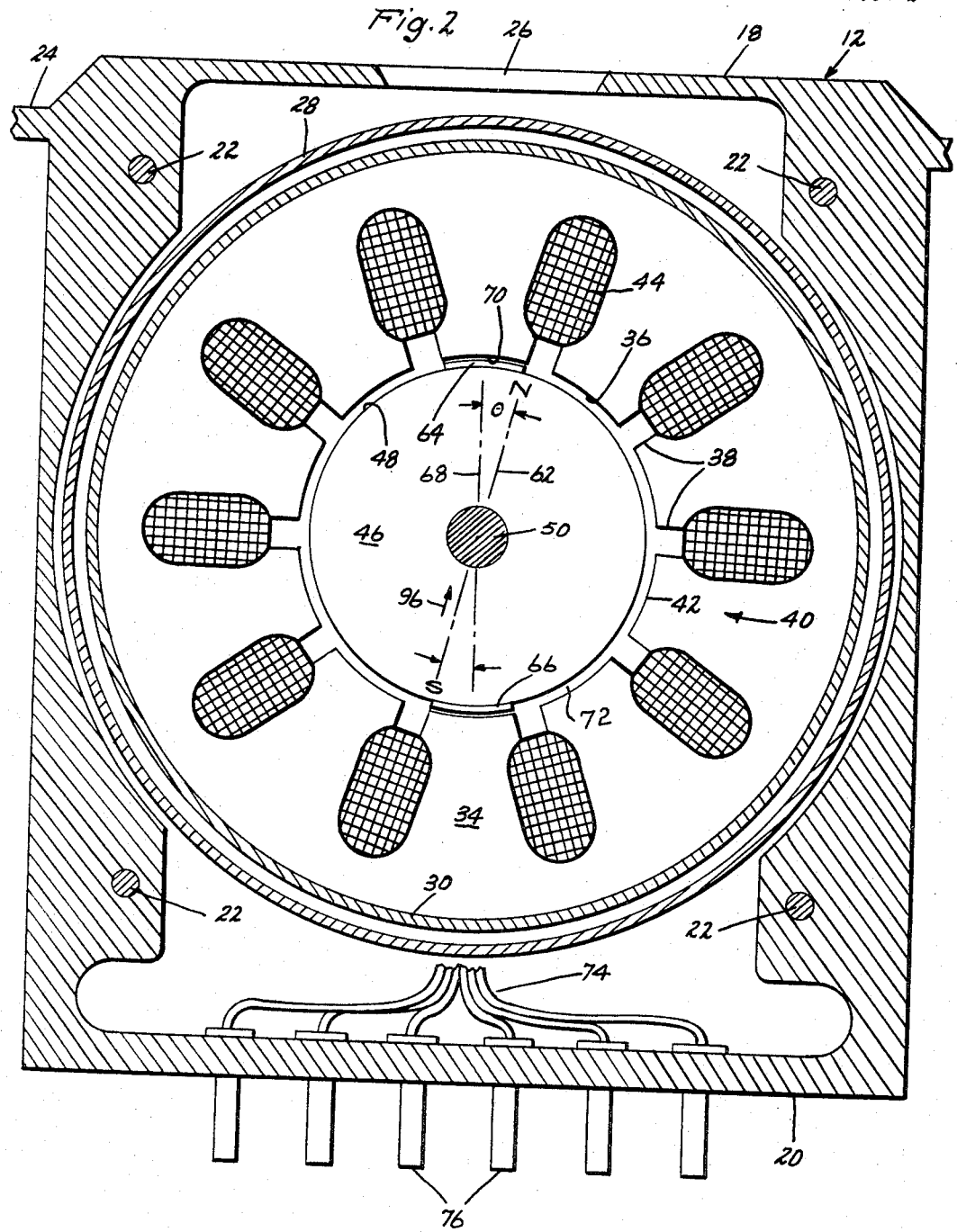
FIG. 2 is a cross-sectional view taken along the line 2—2 of FIG. 1.

Rotor 46 is permanently magnetized diametrically with an axis of polarization 62, as best seen in FIG. 2. In accordance with the invention, a pair of arcuate pole shoes 64, 66 are provided formed of relatively thin magnetic material diametrically oppositely secured to the cylindrical surface 48 of the permanent magnet rotor member 46, as by means of a suitable adhesive. Pole shoes 64, 66 are symmetrically disposed on axis 68 which is angularly displaced from the magnetic axis 62 by a small angle $\theta$, as best seen in FIG. 2. Pole shoes 64, 66 preferably have the same angular extent as the stator pole faces 42. The angle $\theta$ is preferably between about 5° and about 25°, and in the illustrated embodiment is 14°. In the illustrated embodiment, pole shoes 64, 66 and the stator pole faces 42 have an annular extent of 28°. It will be seen that the pole shoes 64, 66 define air gaps 70 with the respective stator pole faces 42 which are narrower than the air gaps 72 formed by the cylindrical surface 48 of the permanent magnet rear member 46 intermediate the pole shoes 64, 66. In a specific embodiment of the invention having a permanent magnet rotor member 46, .5 inch in diameter, pole shoes 64, 66 are formed of magnetic material .005 inch in thickness. In the preferred embodiment of the invention, the grain of the permanent magnet material of which the rotor member 46 is formed is parallel with the axis 68 of the pole shoes 64, 66, i.e., the axis of polarization 62 is at an angle $\theta$ with respect to the grain.

Field windings 44 are coupled by suitable electrical leads 74 to appropriate terminals 76 extending through the bottom wall 20 of housing part 12.

Figure 3:
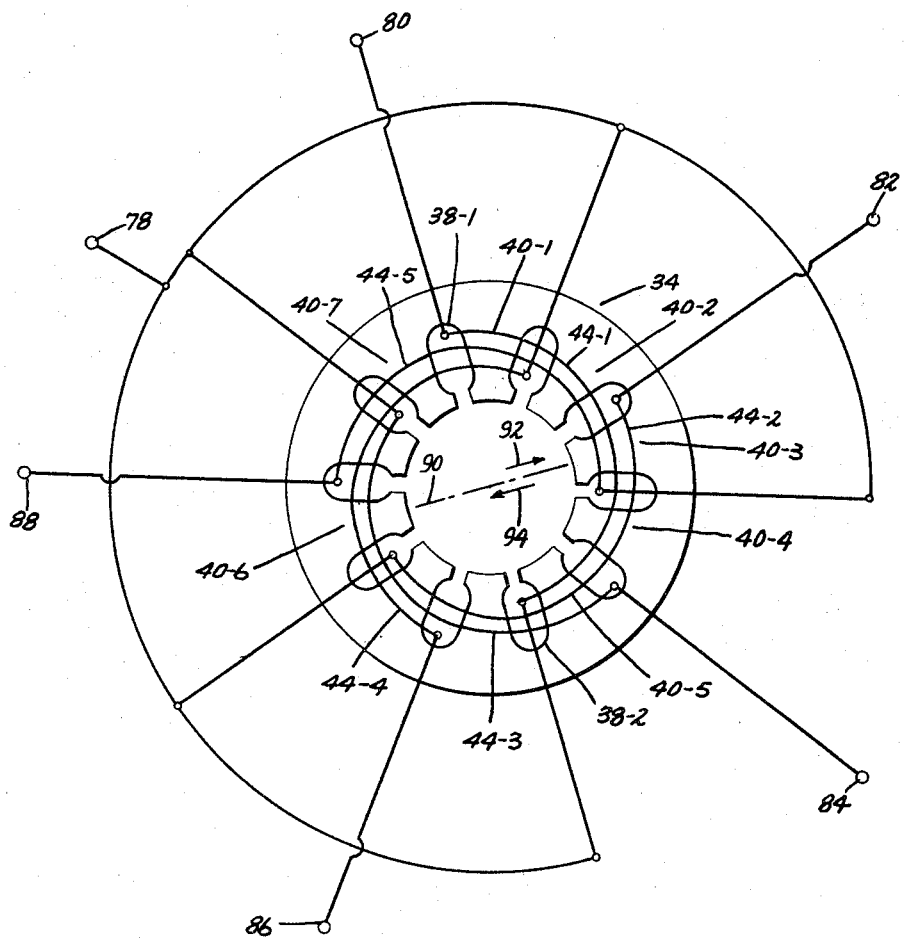
FIG. 3 is a schematic diagram illustrating the arrangement of the field windings of the device of FIGS. 1 and 2.

Referring now to FIG. 3, in the illustrated embodiment, five (5) field coils 44–1, 44–2, 44–3, 44–4 and 44–5 are provided. Each of these field coils spans five stator poles or teeth 40. Thus, field coil 44–1 spans stator poles 40–1, 40–2, 40–3, 40–4 and 40–5 and has its sides respectively wound in slots 38–1 and 38–2. The remaining field coils are similarly wound in distributed fashion as is well known to those skilled in the art. Each of the field coils 44 has one end connected to a common terminal 78, the other ends of the field coils being respectively connected to terminals 80, 82, 84, 86 and 88.

Assuming now that coil 44–1 is energized by coupling terminal 78, 80 across a source of direct current potential of given polarity, it will be seen that the stator will be magnetically energized along an axis shown by the dashed line 90 extending between stator poles 40–3, 40–6, the magnetic flux traversing the air gap and the rotor 46 in the direction shown by the arrow 92. It will further be readily seen that reversal of the polarity of the voltage applied across terminals 78, 80 will reverse the direction of magnetic flux as shown by the arrow 94. It will further be seen that energization of field winding 44–2 in one polarity across terminals 78, 80 will provide a magnetic field of one polarity along an axis extending between stator poles 40–5, 40–7 and that reversal of the polarity of the voltage applied across terminals 78, 82 will likewise reverse the polarity of the field on the same axis. It will thus be seen that selective energization of each of the five field windings 44 in either polarity will provide ten different directions of magnetic energization along five equally spaced axes.

It will further be readily understood that when any one of the field windings 44 is energized with a given polarity, the magnetic axis 62 of the rotor 46 will align itself with the axis of field energization and in the same direction. Thus, when field winding 44–1 is energized to provide field energization in the direction shown by the arrow 92, magnetic axis 62 of rotor 46 will be aligned with the field axis 90 and with the direction of magnetic polarization, as shown by the arrow 96 in FIG. 2, in the same direction as the arrow 92. It will further be seen that reversal of the polarity of the voltage applied to the winding 44–1 which results in 180° reversal of the direction of field energization along axis 90, as shown by the arrow 94, should result in 180° rotation of the rotor 46 so that the direction of magnetic polarization 96 extends in the same direction as the direction of field energization 94. However, as will be hereinafter described, such a 180° reversal of field energization does not result in the production of torque to effect 180° rotation of the rotor 46, thus resulting in the aforementioned top dead-center position.

It will be readily understood that different stator core and winding configurations may be employed. For example, while field windings of the distributed type are shown in FIG. 3, the field coils may embrace each of the stator poles or teeth 40 thereby providing salient poles, or may embrace only selected stator teeth with reliance being placed upon the production of consequent poles. It will further be observed that the present invention is not restricted to the provision of ten stator teeth, but on the contrary that a greater number of stator teeth may be provided if a corresponding greater number of rotor positions is desired. It will also be seen that a stator core configuration employing only five teeth may be employed to obtain ten rotor positions and that a smaller number of external connections to the field coils may be employed by selectively coupling the coils in delta or Y connections.

Referring now to FIG. 4 in the illustrated embodiment, the drum 28 has digits from zero (0) to nine (9) displayed thereon. While the digits may be displayed in numerical sequence, in the specific embodiment illustrated, a part of the logic of the system in which the magnetic digital indicator of the invention is employed is provided by arrangement of the digits on the drum 28. It will be seen that in the illustrated embodiment, the digits two and three are located diametrically opposite each other on the drum 28 and in alignment with the magnetic axis 62, the digits zero and one, seven and six, nine and eight, and four and five also being respectively diametrically opposite each other on the drum 28. Thus, with a field winding 44 energized with one polarity to display the digit two through the window 26, reversal of the polarity of the voltage applied to the respective field winding 44 will rotate the rotor member 46 and the drum 28 by 180° to display the digit three, as will be hereinafter described.

Referring briefly to FIG. 5, a stator core 34 having ten teeth or stator poles 40 and a permanent magnet rotor 46 is shown, the rotor being diametrically polarized along axis 62. As abovedescribed, if the stator teeth 40–3, 40–6 are energized to provide magnetic energization in the direction shown by the arrow 92, the rotor 46 will be positioned with its magnetic axis 62 oriented with its direction of polarization 96 in the same direction as the direction of stator energization 92. It will further be seen that if stator teeth 40–4, 40–7 are energized, thus providing stator energization along axis 98 in the direction shown by the arrow 100, an angular displacement $\phi$ is provided between the new axis of stator energization 98 and the previous axis of stator energization 90.

Referring now additionally to FIG. 6, it will be seen that the torque available for rotation of the rotor 46 is a function of the angle φ of displacement of the magnetic axis 62 of the rotor 46 from the axis of stator energization, as shown by the curve 102. Thus, maximum rotational torque is available when the angle φ is 90° and no torque is available when the angle φ is 0° and 180°. It is thus seen that 180° reversal of the direction of field energization resulting from reversal of the polarity of the voltage applied to one of the field windings 44 in FIG. 3, as abovedescribed, does not result in the production of torque to provide a corresponding 180° rotation of rotor 46.

Referring now to FIG. 7, in the stepping motor construction of the invention, with the diametrically opposite stator poles or teeth 40–3, 40–6 energized to provide magnetic flux in the direction shown by the arrows 92, rotor 46 will be positioned with its magnetic axis 62 in alignment with the axis 90 of field energization and with its magnetic flux 96 traversing the rotor, air gaps and the stator in the same direction as the stator flux 92.

Referring now to FIG. 8, when the stator is de-energized, i.e., none of the field windings 44 are energized, the permanent magnet flux 96 seeks the minimum reluctance air gaps, which are the air gaps 70 between the pole shoes 64, 66 and the adjacent stator pole faces 42, thus providing a reluctance torque to rotate the rotor so as to bring the pole shoes 64, 66 into alignment with the adjacent stator poles or teeth 40–3, 40–6. The pole shoes 64, 66 thus provide a reluctance torque sufficient to rotate the rotor 46 by the angle θ which is the angular displacement of the magnetic axis 62 from the axis 68 of the pole shoes 64, 66, i.e., 14° in the specifically illustrated embodiment. When this small rotation of the rotor 46 has thus been effected, the permanent magnet flux 96 is redistributed and distorted, as shown in FIG. 8.

It will now be seen that when the stator is de-energized, the rotor 46 is rotated under the influence of reluctance torque so that the axis 68 of the pole shoes 64, 66 is in alignment with the axis of the adjacent diametrically opposite stator core teeth, thus angularly displacing the magnetic axis 62 of the rotor 46 by the angle θ. Referring again to FIG. 6, this displacement of the magnetic axis 62 of the rotor 46 moves the angle φ to point 104 on curve 102, i.e., 14° removed from the 180° point in the specific embodiment. Thus, if the stator poles 40–3, 40–6 are now energized in the opposite direction 94, torque is available for rotating the rotor 46 through 166° to the opposite rotational position to display the desired digit. Stated simply, de-energization of the stator results in slight angular displacement of the rotor so as to move it off of the top dead-center position so as to permit subsequent 180° rotation of the rotor in a single step if desired. It will be observed that this displacement of the rotor in response to de-energization of the field does not in any way affect rotation of the rotor in steps less than 180° since a displacement angle φ is always provided.

While there have been described above the principles of this invention in connection with specific apparatus, it is to be clearly understood that this description is made only by way of example and not as a limitation to the scope of this invention.

What is claimed is:

1. In a stepping motor including a stator core member having means forming a plurality of discrete pole faces defining a bore and winding means for selectively energizing said pole faces; a permanent magnet rotor member in said bore, said rotor member having a peripheral surface defining first radial air gaps with said stator pole faces and being diametrically polarized on a first axis, said rotor member having means forming a pair of diametrically opposite pole faces thereon projecting radially outwardly from said peripheral surface, said rotor pole faces being disposed on a second axis angularly displaced from said first axis and respectively defining second radial air gaps with said stator pole faces narrower than said first air gaps whereby said first axis is aligned with a respective stator pole face when said winding means is energized and said second axis is aligned with a respective stator pole face when said winding means is de-energized thereby permitting 180° rotation of said rotor member in a single step.

2. The motor of claim 1 wherein said angular displacement is between 5° and 25°.

3. The motor of claim 1 wherein said rotor pole faces respectively have an angular extent substantially equal to that of one of said stator pole faces.

4. The motor of claim 1 wherein said rotor member has generally arcuate peripheral surface portions respectively intermediate said rotor pole faces, said surface portions having a diameter less than that of said rotor pole faces.

5. The motor of claim 1 wherein said rotor member has a generally cylindrical outer peripheral surface with radially outwardly extending pole shoes thereon respectively forming said rotor pole faces.

6. The motor of claim 1 wherein the grain of said rotor member is generally parallel to said second axis.

7. The motor of claim 1 wherein said rotor member has a cylindrical outer peripheral surface, and futher comprising arcuate pole shoe members respectively secured to said outer surface, said pole shoe members forming said rotor pole face portions.

8. In a stepping motor including: a stator core member having a central bore with a plurality of equally spaced slots extending radially outwardly therefrom and mutually defining a plurality of discrete poles each having a pole face and winding means in said slots for selectively energizing said poles; a cylindrical permanent magnet rotor member rotatably mounted in said bore and defining a first air gap with said stator pole faces, said rotor member being diametrically polarized on a first axis; and a pair of diametrically opposite arcuate pole shoes secured to said rotor member and respectively defining second air gaps with said stator pole faces narrower than said first air gaps, said pole shoes being symmetrically disposed on a second axis angularly displaced from said first axis whereby said first axis is aligned with a respective stator pole face when said winding means is energized and said pole shoes are aligned with a respective stator pole face when said winding means is de-energized thereby permitting 180° rotation of said rotor member in a single step.

9. The motor of claim 8 wherein said pole shoes respectively have an angular extent substantially equal to that of said stator pole faces.

10. The motor of claim 8 wherein said angular displacement is between 5° and 25°.

11. The motor of claim 8 wherein said rotor member is formed of permanent magnet material having its grain substantially parallel to said second axis.

References Cited

UNITED STATES PATENTS 3,311,911   3/1967   Pursiano _____ 310—49

J. D. MILLER, *Primary Examiner.*

MILTON O. HIRSHFIELD, *Examiner.*

G. NUNEZ, *Assistant Examiner.*

U.S. Cl. X.R.

310—156, 74